(12) United States Patent
Bavendiek (10) Patent No.: US 10,712,291 B2
(45) Date of Patent: Jul. 14, 2020

(54) DETECTOR WITH REDUCED-SIZE EDGE PIXEL ELEMENTS

(71) Applicant: YXLON INTERNATIONAL GMBH, Hamburg (DE)

(72) Inventor: Klaus Bavendiek, Norderstedt (DE)

(73) Assignee: YXLON INTERNATIONAL GMBH, Hamburg (DE)

(*) Notice: Subject to any disclaimer, the term of this patent is extended or adjusted under 35 U.S.C. 154(b) by 0 days.

(21) Appl. No.: 16/157,514

(22) Filed: Oct. 11, 2018

(65) Prior Publication Data

US 2020/0064280 A1 Feb. 27, 2020

(30) Foreign Application Priority Data

Oct. 17, 2017 (DE) .......................... 10 2017 124 077

(51) Int. Cl.
*G01N 23/046* (2018.01)
*G01N 23/04* (2018.01)
*G01T 1/20* (2006.01)

(52) U.S. Cl.
CPC ........... *G01N 23/04* (2013.01); *G01T 1/2018* (2013.01)

(58) Field of Classification Search
CPC .... G01N 23/04; G01N 23/046; G01T 1/2018; G01T 1/241
See application file for complete search history.

(56) References Cited

U.S. PATENT DOCUMENTS

| 9,143,708 B2* | 9/2015 | Yin .................... H04N 5/3591 |
| 2009/0080609 A1* | 3/2009 | Shinden ................ A61B 6/484 378/62 |
| 2011/0102802 A1* | 5/2011 | Izatt ...................... A61B 3/102 356/479 |
| 2012/0328028 A1* | 12/2012 | Sadafale ............. H04N 19/159 375/240.24 |
| 2019/0244555 A1* | 8/2019 | Lin .......................... G09G 3/20 |

* cited by examiner

*Primary Examiner* — Mekonnen D Dagnew
(74) *Attorney, Agent, or Firm* — Abelman, Frayne & Schwab (57) ABSTRACT

To compensate for artifacts in a visual display, a detector is provided having a first sensor element (2a, 2a', 2a'', 2a''') including a plurality of first pixel elements (7a, 8a) arranged linearly one behind another, and a second sensor element (2b, 2b', 2b'', 2b''') having a plurality of second pixel elements (7b, 8b) arranged linearly one behind another. Edge pixel elements (8a, 8b), which are arranged linearly one behind another and in line with the first and second central pixel elements (7a, 7b), are provided in a gap between the closest-together first and second central pixel elements (7a, 7b) of the first and second sensor elements (2a, 2a', 2a'', 2a''', 2b, 2b', 2b'', 2b''') arranged next to one another. The edge pixel elements (8a, 8b) have a width that is less than first and second widths of the respective first and second central pixel elements (7a, 7b).

18 Claims, 8 Drawing Sheets

$$Width(R) = c = \frac{IA - (\#R-2)*d - 2e - 2x - y}{\#R} = \frac{\#R*(b+a) + a - (\#R-2)*d - 2e - 2x - y}{\#R}$$

FIG. 7

$IA = \#R^* (b + a) + a = \#R^* c + (\#R - 2)^* d + 2e + 2x + y$ $\text{Width}(R) = c = \dfrac{IA - (\#R - 2)^* d - 2e - 2x - y}{\#R} = \dfrac{\#R^*(b + a) + a - (\#R - 2)^* d - 2e - 2x - y}{\#R}$

FIG. 8

DETECTOR WITH REDUCED-SIZE EDGE PIXEL ELEMENTS

CROSS REFERENCE TO RELATED APPLICATION

This application claims priority to International Application No. PCT/EP2017/056223, filed on Mar. 16, 2017, which claims the benefit to German patent application number DE 10 2016 105548.4, filed on Mar. 24, 2016, the content of which are incorporated by reference herein in their entireties.

FIELD OF THE INVENTION

The present invention relates to a detector.

BACKGROUND OF THE INVENTION

A generic detector such as disclosed in DE 10 2010 051 774 A1 includes a detector which is used in industrial computed tomography. As in medical computed tomography, in industrial computed tomography for material testing an X-ray beam is directed at a component to be tested. The X-radiation passing through the component is detected in a detector, and three-dimensional images and/or sectional images through the component to be examined are generated by means of a computer.

DE 10 2010 051 774 A1 describes a detector which is composed of a plurality of sensor elements arranged next to one another in the longitudinal direction. There, for example, several sensor elements are combined in one detector module; in addition to the sensor elements, each detector module also has a signal processing functionality, by means of which the signals detected in the sensor elements are processed. The individual detector modules are arranged one behind another in a row, with the result that a so-called linear detector is provided.

In DE 10 2010 051 774 A1, this linear detector is U-shaped, since it is used there to test so-called tire cords, which are steel belts in truck tires.

Each sensor element in DE 10 2010 051 774 A1 has a plurality of pixel elements arranged next to one another, with the result that a line is defined by the pixel elements arranged behind one another. The pixel elements in each of the sensor elements have the same width and are fitted at a predefined spacing from one another which is always the same.

Due to the fact that the pixel elements cannot be installed directly up to the border of a detector module, the situation arises that between two adjacent detector modules a so-called inter-pixel spacing between two adjacent pixel elements of these different modules is larger than the spacing between the corresponding pixel elements within such a module. A kind of "blind spot" in the generated image is thereby brought about at this site.

In the described state of the art, this initial drawback is resolved in that a virtual pixel is generated in this gap from the measurement results from adjacent edge pixel elements and this "blind spot" is thus compensated for at least by extrapolation.

Especially when testing tires, it has become apparent that even with this construction of a virtual pixel it is not always ensured that the precise course of the cords in the tires is determined accurately, since an offset in the generated image sometimes arises in the region of the virtual pixel, with the result that it appears as if they are broken there.

Starting from the problem described above, the invention proposes a detector in which a more meaningful image can be generated even in a gap between adjacent pixels of different sensor elements.

SUMMARY OF THE INVENTION

The problems above are solved with the detector of claim 1.

The detector has a first sensor element, which has a plurality of first pixel elements arranged linearly one behind another with a first width, and has a second sensor element, which has a plurality of second pixel elements arranged linearly one behind another with a second width, which corresponds to the first width. The width of a pixel element corresponds to the dimension in the direction of the line defined by the pixel elements arranged one behind another. The first and second sensor elements are fitted next to one another, with the result that the second pixel elements are arranged in a line as an extension of the first pixel elements. The first pixel elements have first central pixel elements, which are arranged linearly one behind another at a first predetermined, substantially equidistant spacing from one another. The second pixel elements have second central pixel elements, which are arranged linearly one behind another at the first predetermined, substantially equidistant spacing from one another, at which the first central pixel elements are arranged from one another. An inter-central-pixel spacing between closest-together first and second central pixel elements of the sensor elements arranged next to one another corresponds to the following Formula 1:

$$i = n*(a+b)+a,  \quad \text{(Formula 1)}$$

wherein i is the inter-central-pixel spacing, n is a natural number, a is the first predetermined, substantially equidistant spacing between central pixel elements, and b is the respective width of the central pixel elements.

Therefore, the inter-central-pixel spacing corresponds, e.g., to the first predetermined, substantially equidistant spacing plus the value which results from an integer multiple of the sum of the first predetermined, substantially equidistant spacing and the respective width of the central pixel elements.

The detector according to the invention is characterized in particular in that edge pixel elements, which are arranged linearly one behind another and in line with the first and second central pixel elements, are provided in a gap between the closest-together first and second central pixel elements of the sensor elements arranged next to one another, wherein the edge pixel elements have a third width, which is smaller than the first and second widths of the first and second central pixel elements. This embodiment ensures that, by means of signal processing, visualization artifacts in the gap between two adjacent edge pixels of two sensor elements are reduced.

It is favorable if in the gap between the closest-together first and second central pixel elements of the sensor elements arranged next to one another such a number of edge pixel elements is provided which corresponds to the natural number n from Formula 1. It can hereby be ensured that, after processing of the sensor signals from the edge pixels, an image containing no artifacts or fewer artifacts is obtained in the visual display if they are adapted to the dimension of the pixels of the central pixels.

It is also possible for the edge pixel elements to be formed by first and second edge pixels, wherein the first edge pixel elements are arranged as an extension of the first central pixel elements in the first sensor element and the second edge pixel elements are arranged as an extension of the second central pixel elements in the second sensor element.

According to an embodiment of the invention, the first edge pixel elements can also be arranged linearly one behind another at a second predetermined, substantially equidistant spacing from one another. The second edge pixel elements can also be arranged linearly one behind another at the second predetermined, substantially equidistant spacing from one another, at which the first edge pixel elements can be arranged from one another. An inter-edge-pixel spacing between closest-together first and second edge pixel elements of the sensor elements arranged next to one another can be larger than the spacing between two adjacent first and, respectively, second edge pixel elements. This larger spacing between edge pixel elements of adjacent sensor elements is, e.g., design-related and is substantially compensated for by the arrangement according to the invention, at least after the signal processing.

According to a possible development of the invention, the number of first edge pixel elements can correspond to the number of second edge pixel elements. A symmetrical design makes production of the sensor elements simpler.

According to a possible development of the invention, the widths of the edge pixel elements of the sensor elements can be identical. In this case, the width c of the edge pixels is calculated according to Formula 2:

$$c = \frac{\#R(b+a) + a - (\#R - 2) * d - 2e - 2x - y}{\#R} \quad \text{(Formula 2)}$$

wherein #R is the number of edge pixel elements in the gap between the closest-together first and second central pixel elements of the sensor elements arranged next to one another, a is the first predetermined, substantially equidistant spacing, b is the respective width of the central pixel elements, d is the second predetermined, substantially equidistant spacing between two adjacent edge pixel elements within the respective sensor element, e is a spacing between an edge pixel element and an adjacent central pixel element within the respective sensor element, x is a spacing between an edge of the sensor element and the edge pixel element, adjacent to the edge, of the respective sensor element, and y is the spacing between two adjacent sensor elements.

If the adjacent sensor elements are arranged on two different printed circuit boards, the variable y in Formula 2 above results from the sum of the spacing between two adjacent printed circuit boards and twice the spacing between the sensor element and the printed circuit board edge.

Ten or more edge pixels can also be provided. In the case of such a number of edge pixels the compensation for the enlarged gap between the edge pixels of adjacent sensor elements is ensured particularly well, since it is incrementally divided over a larger width. Other advantageous values are 2, 3, 4, 5, 6, 7, 8, 9, 11, 12, 13, 14, 20 and 25. Each of these values per se can form an upper or lower limit.

The natural number n from Formula 1 can also be ten or more. In the case of such a spacing the compensation for the enlarged gap by the image processing is carried out over a larger range. Other values for the number n can also be 2, 3, 4, 5, 6, 7, 8, 9, 11, 12, 13, 14, 20 and 25. Each of these values per se can form an upper or lower limit.

It has proved to be favorable that the first and second sensor elements are arranged on a common printed circuit board. The compensation for the design-related spacings can also be effected between sensor elements on a common printed circuit board.

As an alternative to the case described above, the first sensor element can also be arranged on a first printed circuit board and the second sensor element can be arranged on a second printed circuit board. The first and second printed circuit boards can be arranged next to one another substantially abutting, with the result that a first border of the first printed circuit board and a second border of the second printed circuit board are opposite one another in such a way that the borders run perpendicularly to the line defined by the pixel elements arranged one behind another.

It is also possible for the spacing between the first edge pixel element closest to the first border and the first border to be larger than the spacing between adjacent first edge pixel elements. Alternatively or additionally, the spacing between the first edge pixel element closest to the first border and the first border can be larger than the spacing between adjacent first central pixel elements. Alternatively or additionally, the spacing between the second edge pixel element closest to the second border and the second border can be larger than the spacing between adjacent second edge pixel elements. Alternatively or additionally, the spacing between the second edge pixel element closest to the second border and the second border can be larger than the spacing between adjacent second central pixel elements.

According to a further embodiment, it is also possible for the sum of the spacing between the first and second borders, the spacing between the first edge pixel element closest to the first border and the first border, and the spacing between the second edge pixel element closest to the second border and the second border to correspond to the inter-edge-pixel spacing.

The edge pixel elements can have a width of between 0.910 mm and 0.920 mm. Further advantageous widths of the edge pixel elements are the following: 0.912 mm, 0.916 mm, 0.917 mm, 0.919 mm. Each of the aforementioned values per se can form upper or lower limits of preferred ranges.

The central pixel elements can have a width of between 0.950 mm and 0.970 mm. Further advantageous widths of the central pixel elements are the following: 0.955 mm, 0.960 mm, 0.965 mm, 0.966 mm. Each of the aforementioned values per se can form upper or lower limits of preferred ranges.

The inter-edge-pixel spacing can be between 0.40 mm and 0.70 mm. Further advantageous values are the following: 0.45 mm, 0.55 mm, 0.60 mm, 0.65 mm. Each of the aforementioned values per se can form upper or lower limits of preferred ranges.

For example, the spacing a between two adjacent pixels within the same sensor element is 50 μm. Two adjacent pixels can be adjacent edge pixel elements, adjacent central pixel elements or an edge pixel element adjacent to a central pixel element. Between two adjacent printed circuit boards to which the sensor elements are applied, a spacing between the abutting borders of, in some cases, 0.15 mm can be provided. The edge pixel elements can be applied with a spacing of 0.2 mm from the printed circuit board edge. The spacing between two adjacent pixels within the same sensor element can also be 25 μm, or any desired value from 25 μm to 75 μm. Further advantageous values for the spacing between the abutting borders are 0.3 mm, 0.2 mm and 0.1 mm. Each of the aforementioned values per se can form upper or lower limits of preferred ranges.

The edge pixel elements can also be applied in the following spacing from the printed circuit board edge: 0.3 mm or 0.1 mm. Each of the aforementioned values per se can form upper or lower limits of preferred ranges.

The following advantageous values can also result from the values described above. The inter-central-pixel spacing can be between 7.728 mm and 11.592 mm. Further advantageous values are the following: 9.66 mm, 8.00 mm, 10 mm. Each of the aforementioned values per se can form upper or lower limits of preferred ranges. The value of 9.66 mm can result if ten edge pixel elements are provided, the value of 11.592 mm can result if twelve edge pixel elements are provided, and the value of 7.728 mm can result if eight edge pixel elements are provided.

It is also favorable if the first and/or second printed circuit board has signal processing components, with the result that a first or second sensor module is formed.

According to an independent aspect of the invention, the latter also specifies a method for displaying detection signals. This method is carried out, e.g., with the detector described above. The method has the following step: processing the sensor signals from the edge pixel elements in such a way that, in a visual display, the dimension of the respective pixel displayed which corresponds to the edge pixel elements is adapted to the dimension of the pixels displayed which correspond to the central pixel elements. The adaptation can be, for example, a multiplication by the factor b/c, wherein b and c correspond to the variables described further above.

Through this method, artifacts which occur due to the design-related larger gap between two adjacent sensor elements, compared with the spacing between adjacent pixel elements within a sensor element, can be compensated for.

BRIEF DESCRIPTION OF THE DRAWINGS

Further advantageous embodiments of the invention are described below with reference to embodiment examples in conjunction with the drawings. There are shown in.

DETAILED DESCRIPTION OF THE INVENTION

Figure 1:
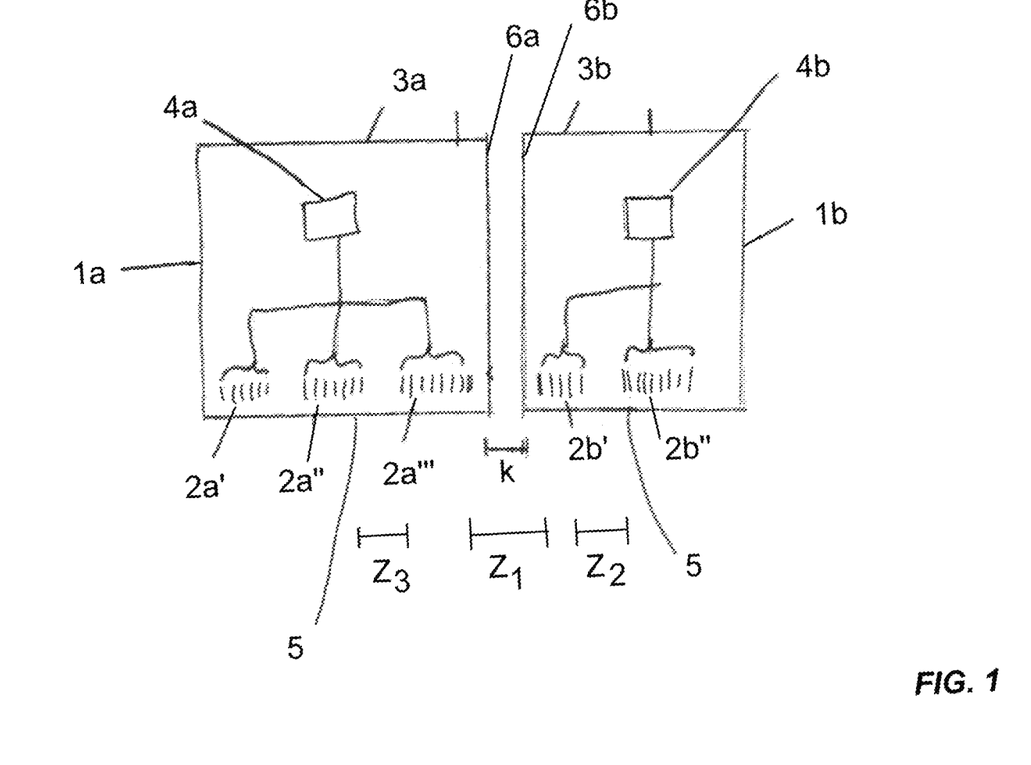
FIG. 1 a schematic structure, in which two detector modules with a plurality of sensor elements are arranged next to one another.

In FIG. 1 a first detector module is represented with the reference sign 1a and a second detector module with the reference sign 1b. As represented schematically by the curly brackets, the first detector module 1a has three sensor elements: 2a', 2a", 2a'''. In the following, these sensor elements are referred to as the first sensor elements 2a', 2a", 2a''' because they are provided in the first detector module 1a. In the embodiment example, the second detector module 1b has only two sensor elements: 2b', 2b", which are referred to in the following as the second sensor elements. These sensor elements are arranged on one printed circuit board 3a, 3b each. Here, the printed circuit board with the reference sign 3a is referred to as the first printed circuit board since it is formed in the first detector module and the printed circuit board with the reference sign 3b is referred to as the second printed circuit board since it is formed in the second detector module. In each case a signal processing functionality 4a, 4b is provided on the printed circuit boards 3a, 3b. This can contain an analog-to-digital converter, various semiconductor components, and/or storage elements. By integrating the signal processing functionality 4a, 4b on the corresponding printed circuit boards 3a, 3b, a large detector can be composed of a plurality of individual detector modules.

In the present example from FIG. 1 only two detector modules 3a, 3b arranged next to one another are represented. Three and more detector modules can also be arranged next to one another in a line. Thus, for example, a line detector is formed.

The individual sensor elements 2a', 2a", 2a''', 2b', 2b" in the corresponding detector modules 1a, 1b in each case per se have a plurality of pixel elements, represented schematically as dashes. Such a pixel element is considered to be an active region, in which a corresponding signal is generated by the entering radiation.

In the present example the pixel elements are formed by a semiconductor layer.

For example, a sensor element for X-radiation has a scintillator, in which incident X-radiation is converted into visible light. This visible light is then detected, for example, in a photodiode. This photodiode is composed, for example, of various pixels.

In the example represented the individual pixel elements in the sensor elements are arranged merely one behind another in a row, with the result that the individual sensor elements 2a, 2a', 2a", 2a''', 2b, 2b', 2b", 2b''' form a linear sensor, and the individual detector modules 3a, 3b accordingly form a linear detector, in which a plurality of pixel elements are arranged one behind another in a single line. Here, the reference signs 2a, 2b are represented only in FIG. 2 and the reference signs 2a', 2a", 2a''', 2b', 2b", 2b''' are represented only in FIG. 1.

Provided that the linear arrangement is taken into account in the present case, it is also not ruled out that, in addition to this line of individual pixel elements, pixel elements are also provided next to one another in a further direction, with the result that, for example, a planar detector is formed. The embodiment according to the invention within the lines can also be applied to adjacent lines in a planar detector. However, it is favorable that only one line, or in particular two lines, of pixels are formed.

Due to the design, both between adjacent sensor elements 2a, 2a', 2a", 2a''', 2b, 2b', 2b", 2b''' of a common detector module 1a, 1b and between adjacent sensor elements 2a, 2a', 2a", 2a''', 2b, 2b', 2b", 2b''' of different detector modules 1a, 1b, spacings are formed which are larger than the spacings between the individual pixel elements within a sensor element.

In the embodiment example from FIG. 1, z3 and z2 denote a so-called inter-edge-pixel spacing z between edge pixels R, 8a, 8b of adjacent sensor elements within a detector module, and z1 denotes the inter-edge-pixel spacing z between edge pixels of adjacent sensor elements of two adjacent detector modules. In particular, z3 denotes the inter-edge-pixel spacing between the edge pixels of the sensor elements with the reference signs 2a'' and 2a''', and z2 denotes the inter-edge-pixel spacing between the edge pixels with the reference signs 2b', 2b''. z1 denotes the inter-edge-pixel spacing between the edge pixels of the sensor elements with the reference signs 2a''' and 2b'. These above-mentioned inter-edge-pixel spacings z can be either the same or different within a module. The inter-edge-pixel spacings between two modules can be either the same or likewise different for all modules arranged linearly one behind another.

Figure 7:
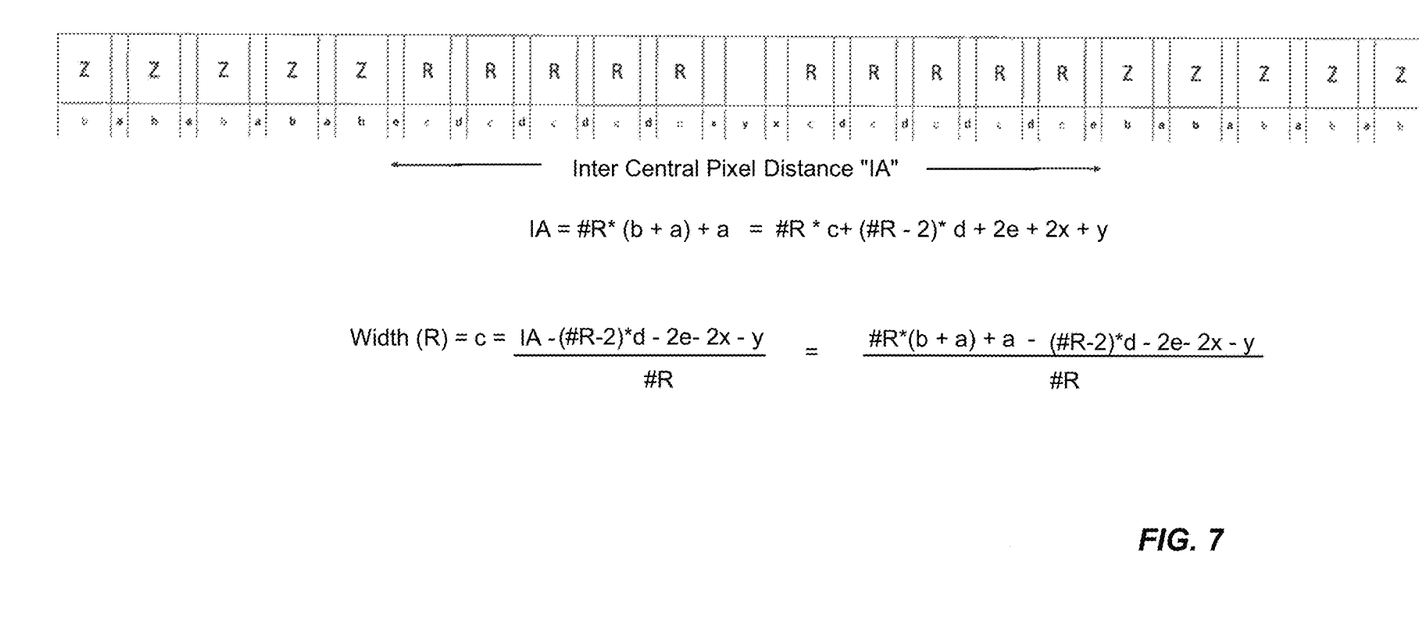
FIG. 7 an example calculation for the width of the edge pixels for edge pixels of identical widths.

Here, the reference sign R is represented only in FIG. 7 and denotes the edge pixels.

In FIG. 1, in addition, the reference sign k denotes a border spacing between adjacent borders 6a, 6b of the first detector module 1a and the second detector module 1b. In addition to the fact that, due to the construction and production, the edge pixel of the sensor element that adjoins the border 6a, 6b has a greater spacing from the border than the spacing between two adjacent pixel elements within a sensor element, it is, due to the design, also not always possible to place the two borders of adjacent detector modules directly abutting. Due to the construction, there will always be a minimum gap here, for example in the millimeter range. Possible gaps between adjacent borders are the following: 0.10 mm, 0.15 mm, 0.2 mm, 0.3 mm. Each of the aforementioned values per se can form upper or lower limits of preferred ranges.

Therefore, the inter-edge-pixel spacing between two adjacent edge pixels 8a, 8b of sensor elements in different detector modules is often larger than the inter-edge-pixel spacing between edge pixels of adjacent sensor elements within a detector module. As a result, undesired artifacts can be produced in the visual display after signal processing of the detected signals.

Figure 2:
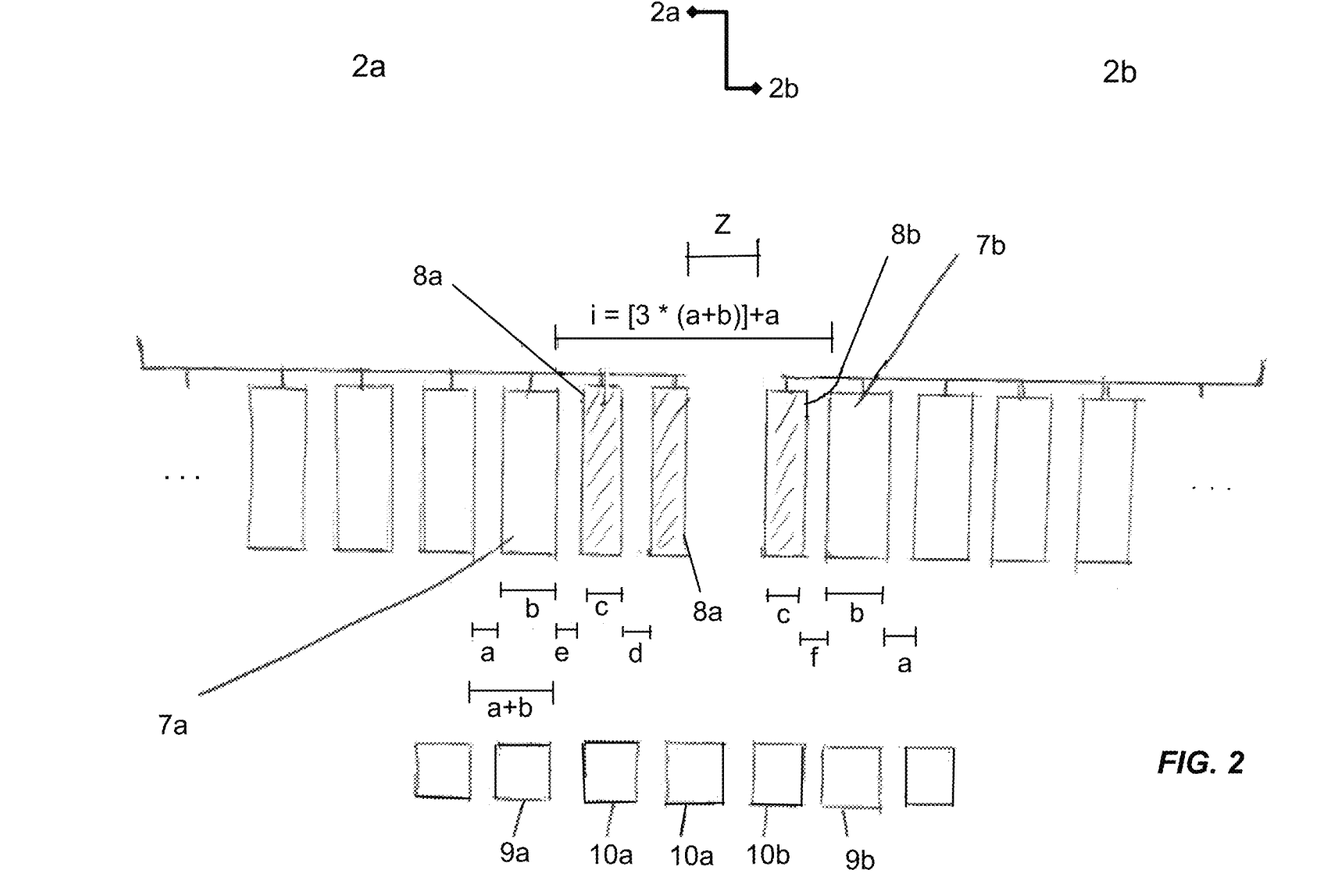
FIG. 2 a detailed view of pixel elements of first and second sensor elements arranged next to one another, as well as a schematic representation of visualized pixels generated after the signal processing.

The present invention therefore proposes, e.g., providing edge pixels 8a, 8b, which have a width that is smaller than the width of the so-called central pixels 7a, 7b, in a gap between closest-together central pixel elements Z, 7a, 7b of sensor elements 2a, 2b arranged next to one another (cf. FIG. 2). Here, the reference sign Z is shown only in FIG. 7 and denotes the central pixels.

Thus, e.g., an inter-central-pixel spacing between closest-together first and second central pixel elements of the sensor elements arranged next to one another corresponds to the following Formula 1:

$$i = n*(a+b)+a,\qquad\text{(Formula 1)}$$

wherein i is the inter-central-pixel spacing, n is a natural number, a is the first predetermined, substantially equidistant spacing, and b is the respective width of the central pixel elements (7a).

Therefore, the inter-central-pixel spacing corresponds, e.g., to the first predetermined, substantially equidistant spacing plus the value which results from an integer multiple of the sum of the first predetermined, substantially equidistant spacing and the respective width of the central pixel elements.

The central pixels are pixels which, unlike the edge pixels, are precisely not situated at the corresponding edges at which two sensor elements terminate.

FIG. 2 shows an example of a detector according to the invention. In the top half of FIG. 2, in which the oblong boxes are represented, the individual pixel elements 7a, 8a, 7b, 8b, as applied, for example, to the surface of a printed circuit board, are represented schematically.

In the bottom half of FIG. 2, with the square elements, the visualized pixels 9a, 9b, 10a, 10b displayed after signal processing are represented. In other words, although the central pixel elements 7a, 7b have a central-pixel width b which is greater than an edge-pixel width c, which corresponds to the width of the edge pixels 8a, 8b, the corresponding visualized pixels 9a, 9b, which correspond to the central pixel elements 7a, 7b, have the same size in the visualized image as the corresponding visualized pixels 10a, 10b, which correspond to the edge pixel elements 8a, 8b. The "blind region" between two adjacent sensor elements can thus be compensated for.

In FIG. 2 the first sensor element 2a is represented on the left-hand side and the second sensor element 2b is represented on the right-hand side. This is indicated by the arrows at the upper edge in FIG. 2.

In FIG. 2 the reference sign 8a denotes the edge pixel elements of the first sensor element 2a; in the following these are defined as the first edge pixel elements. The edge pixel element of the second sensor element 2d is referred to as the second edge pixel element 8b. The central pixel elements of the first sensor element 2a are marked with the reference sign 7a and are referred to in the following as the first central pixel elements, and the central pixel elements of the second sensor element 2b are marked with the reference sign 7b and are referred to in the following as the second central pixel elements.

The dots represented in FIG. 2 indicate that the sensor elements 2a, 2b can contain more than the pixel elements represented in the figure. Each sensor element can contain pixel elements which are arranged relative to one another in a strip, with the result that the edge pixels, which are narrower, seen relatively, than the central pixels, are arranged only at a single edge. However, these edge pixels can also be provided at both edges of the pixel group.

In FIG. 2 two first edge pixel elements 8a with a pixel width c which is narrower than the central pixels are provided, and only a single second edge pixel element 8b is provided in the second sensor element 2b. In the figure, c denotes the width of the edge pixel elements and b denotes the width of the central pixel elements.

The spacing between two adjacent central pixel elements is denoted by a in the figure; the spacing between two adjacent edge pixel elements within a sensor element is denoted by d in the figure. The so-called inter-edge-pixel spacing between edge pixel elements of adjacent sensor elements is denoted by z. In addition, the reference signs e and f in the figure denote a spacing between two adjacent pixels of a sensor element, wherein one of the pixels is a central pixel and the other of the pixels is an edge pixel.

In the present embodiment example, the spacings between the adjacent first central pixel elements 7a of the first sensor element 2a and also between the adjacent second central pixel elements 7b of the second sensor element 2b are the same. These spacings between adjacent central pixels are also the same in each case between two sensor elements.

The spacings between a central pixel and an adjacent edge pixel in the first sensor element 2a and also in the second sensor element 2b (cf. reference signs e and f) likewise correspond to the spacing a between two central pixels, and the spacing e between two adjacent edge pixel elements within a sensor element likewise corresponds to the spacing a between two central pixel elements.

In the present embodiment example, therefore, the spacing between respectively adjacent pixel elements within a sensor element is substantially always constant. However, spacings between a central pixel element and an adjacent edge pixel element within the same sensor element can also be different from the spacings between adjacent central pixel elements within a sensor element. The spacing between two adjacent edge pixel elements within the same sensor element can also be different from the spacings between adjacent central pixel elements within a sensor element.

However, it is favorable that the spacing between all adjacent pixel elements is the same within a sensor element.

As represented in FIG. 2, a so-called intra-central-pixel spacing, i.e. a spacing between closest-together central pixel elements of sensor elements arranged next to one another, corresponds to the Formula 1 already discussed above.

In FIG. 2, the natural number n of Formula 1 is three and i therefore corresponds to 3*(a+b)+a.

Within this intra-central-pixel spacing i, there are a total of three edge pixel elements 8a, 8b, which are formed narrower than the central pixel elements.

The fact that the number of edge pixel elements 8a, 8b corresponds to the natural number in Formula 1 is not necessary for the invention, but is advantageous for it. Thus, namely, as represented at the bottom in FIG. 2, the visualized pixels 10a, 10b, which result from the edge pixel elements 8a, 8b, can be arranged simply in a sequential and equidistant sequence between the visualized pixels 9a, 9b, which result from the central pixel elements 7a, 7b, and thus a homogeneous display can be produced.

The number of edge pixel elements which are narrower than the central pixel elements in each sensor element is not limited. It can be different or also the same in each case for adjacent sensor elements. Thus, although in the present embodiment example from FIG. 2 the number of edge pixel elements in the adjacent sensor elements is different, namely two in the first sensor element 2a and one in the second sensor element 2b, in the embodiment examples in FIGS. 4 to 6, for example, a total of ten edge pixel elements are provided, wherein in each case five edge pixel elements belong to a sensor element on either side. Accordingly, in this advantageous embodiment example of FIGS. 4 to 6, the sum of the first edge pixel elements 8a corresponds to the sum of the second edge pixel elements 8b. Other advantageous values of numbers of edge pixels are 2, 3, 4, 5, 6, 7, 8, 9, 11, 12, 13, 14, 20 and 25. Each of these values per se can form an upper or lower limit.

Central pixel elements denote those pixels which in any case are not situated at the edges of the sensor element which are arranged next to one another, with the result that a linear pixel arrangement results.

The embodiment with the edge pixel elements narrower than the central pixel elements can compensate for the design-related spacing between two sensor elements on a common printed circuit board, i.e. in a common detector module, or else also for the design-related spacing if the respective sensor elements situated next to one another are sensor elements of different detector modules, as represented by the spacing z1 in FIG. 1.

Figure 3:
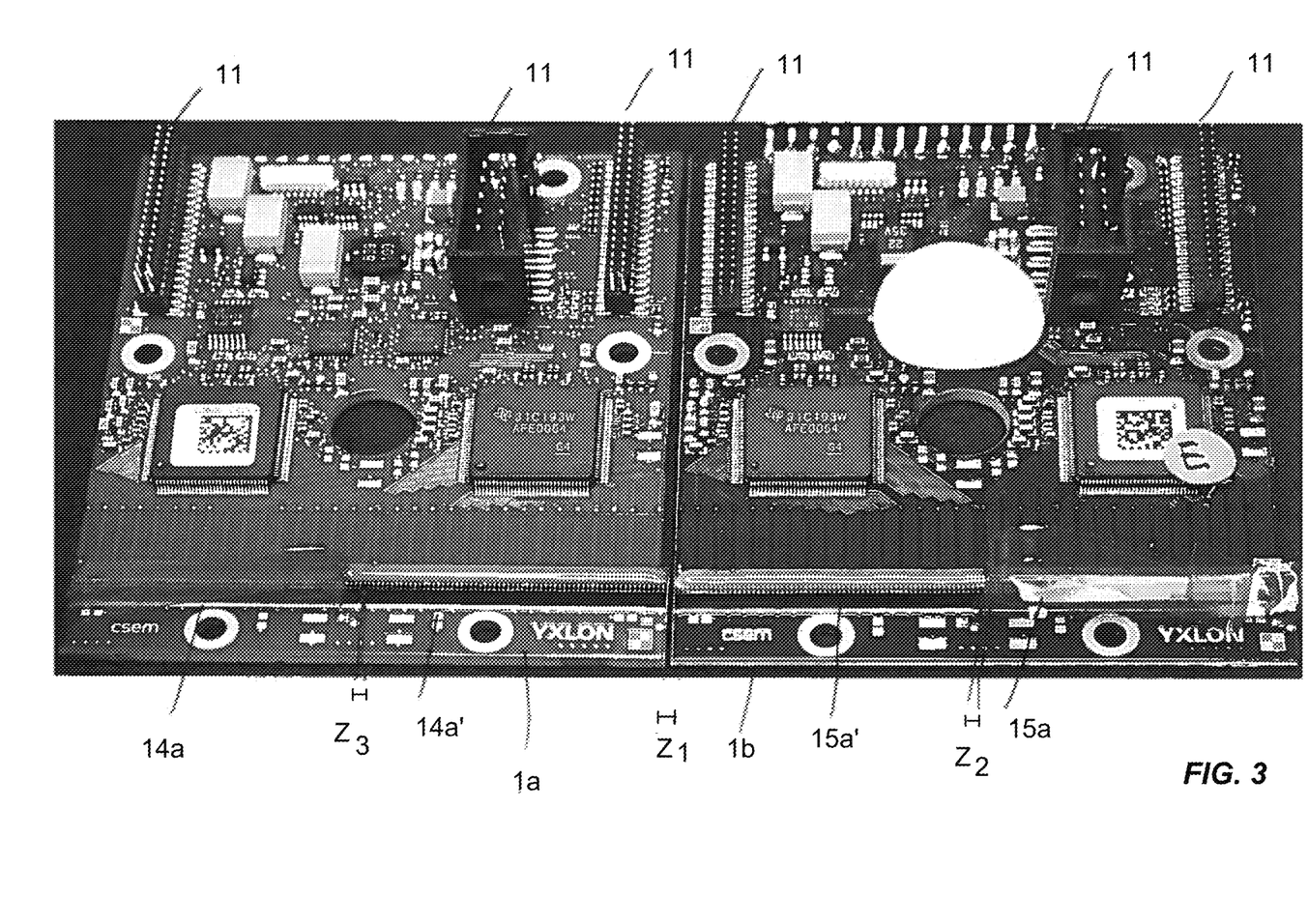
FIG. 3 two detector modules arranged next to one another, which show a design which is helpful for understanding the invention.

In FIG. 3 an oblique top view of two detector modules 1a, 1b fitted next to one another is represented. These detector modules are modules in which the edge pixels are not formed narrower than the central pixel elements as in the invention. This view is described for easier understanding of the invention, since the detector modules according to the invention can otherwise also be formed as can be seen in FIG. 3. It is recognizable herein that two photocells 14a, 14a' are provided on the first detector module 1a, wherein each of these photocells corresponds to a sensor element and each of these sensor elements is composed of a plurality of pixel elements arranged one behind another, which is not recognizable in the figures. Two photocells 14a, 14a' are also provided on the second detector module 1b.

In this figure too, z1 denotes an inter-pixel spacing between edge pixel elements of adjacent sensor elements of the two adjacent detector modules, and z2 and z3 denote an inter-edge-pixel spacing between edge pixel elements of adjacent sensor elements within a detector module.

The pixel elements run in a row, substantially parallel to a border of the printed circuit boards 3a, 3b and at a spacing x from the border. The control and processing electronics are arranged in a distal region of the pixel elements, when seen from the border. The corresponding elements, which are denoted by the reference sign 11, represent plug elements via which the modules can be connected.

Figure 4:
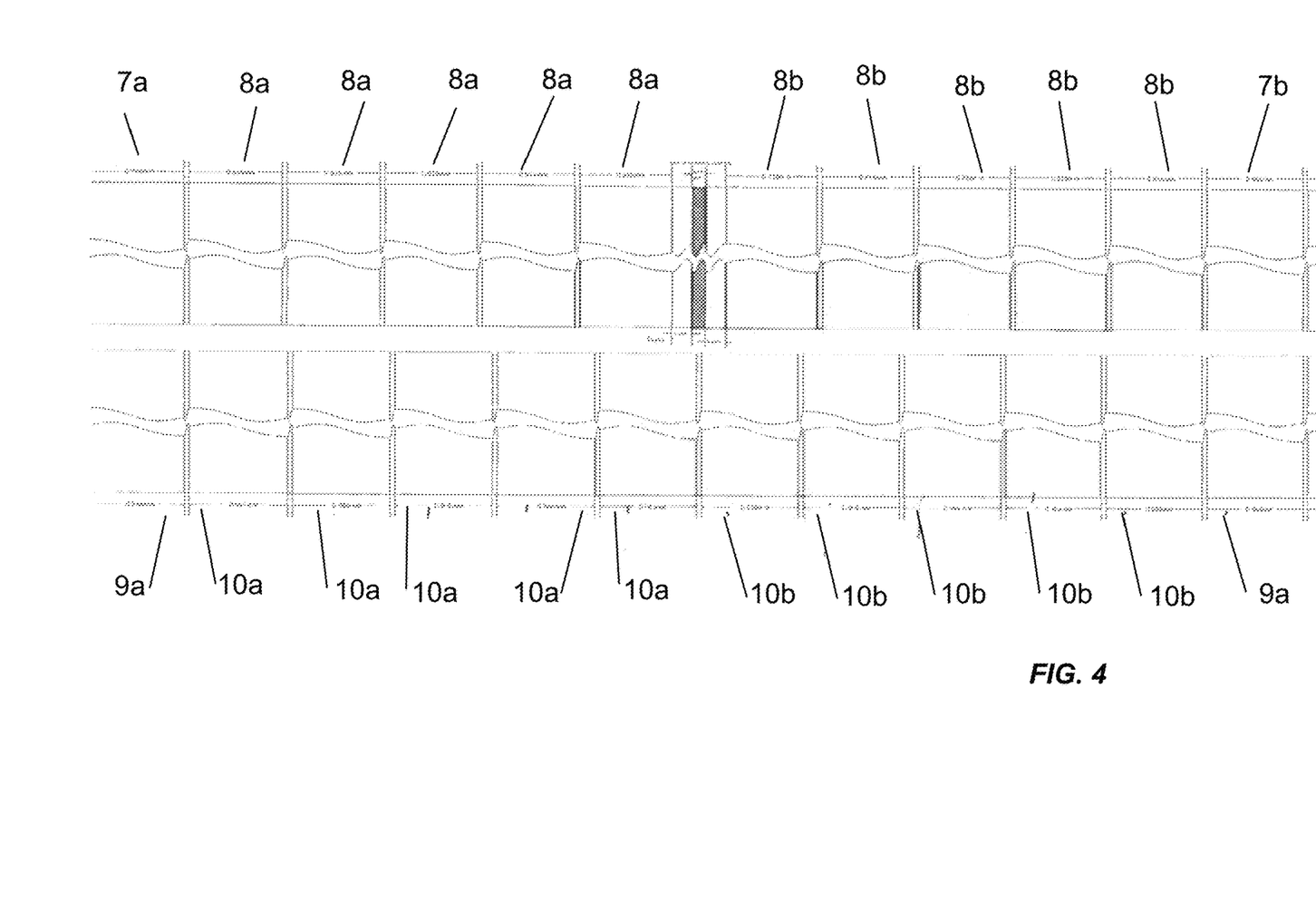
FIG. 4 a schematic view of an embodiment example of a detector according to the invention.

FIG. 4 shows a schematic view of an alternative embodiment in which a total of ten edge pixel elements 8a, 8b are provided, which are surrounded on both sides by central pixel elements 7a, 7b. In the present case, only two central pixel elements 7a, 7b are represented on each side in the longitudinal direction. However, the sensor element is extended further in the longitudinal direction than represented there, with the result that more than these two central pixel elements are provided in each sensor element.

Advantageous numbers of central pixel elements within a sensor element are the following: 22, 54, 118 for ten edge pixels in each case. Each of these values per se can form upper and lower limits.

Favorable numbers of edge pixel elements are 20, 10, 15 and 5. Each of these values per se can form upper and lower limits.

Accordingly, the multiple of the sum of the first predetermined, substantially equidistant spacing and the width of the central pixel elements is precisely advantageously the values mentioned above.

In the example from FIG. 4 the edge pixels are 0.916 mm wide. Further advantageous widths of the edge pixel elements are the following: 0.912 mm, 0.916 mm, 0.917 mm, 0.919 mm. Each of the aforementioned values per se can form upper or lower limits of preferred ranges.

In the present embodiment example from FIG. 4 the central pixel elements have a width of 0.966 mm. Further advantageous widths of the central pixel elements are the following: 0.955 mm, 0.960 mm, 0.965 mm, 0.966 mm. Each of the aforementioned values per se can form upper or lower limits of preferred ranges.

In the example from FIG. 4 the intra-edge-pixel spacing between adjacent edge pixel elements is 0.55 mm in total. Further advantageous values are the following: 0.40 mm, 0.60 mm, 0.70 mm. Each of the aforementioned values per se can form upper or lower limits of preferred ranges.

Due to the design, the board spacing in the present example is 0.15 mm. Further advantageous values are the following: 0.10 mm or 0.20 mm. Each of the aforementioned values per se can form upper or lower limits of preferred ranges.

In the present case, the spacing between an edge pixel and the respective border of the detector module is 0.20 mm for both modules. Further advantageous values are the following: 0.10 mm or 0.30 mm. Each of the aforementioned values per se can form upper or lower limits of preferred ranges. The spacings between the edge pixel and the border can also vary for different modules.

In the lower part of FIG. 4 the visual display of the data acquired by the central and edge pixel elements is to be seen. It is to be seen here that all the pixel elements have the same width in the display, namely the width of the central pixels of 0.966 mm. This width is arbitrarily chosen, and any other width can also be represented in the visualization. In FIG. 4, the visualized pixels resulting from the central pixels are represented with the reference signs 9a, 9b, and the visualized pixels resulting from the edge pixels are represented with the reference signs 10a, 10b.

Figure 5:
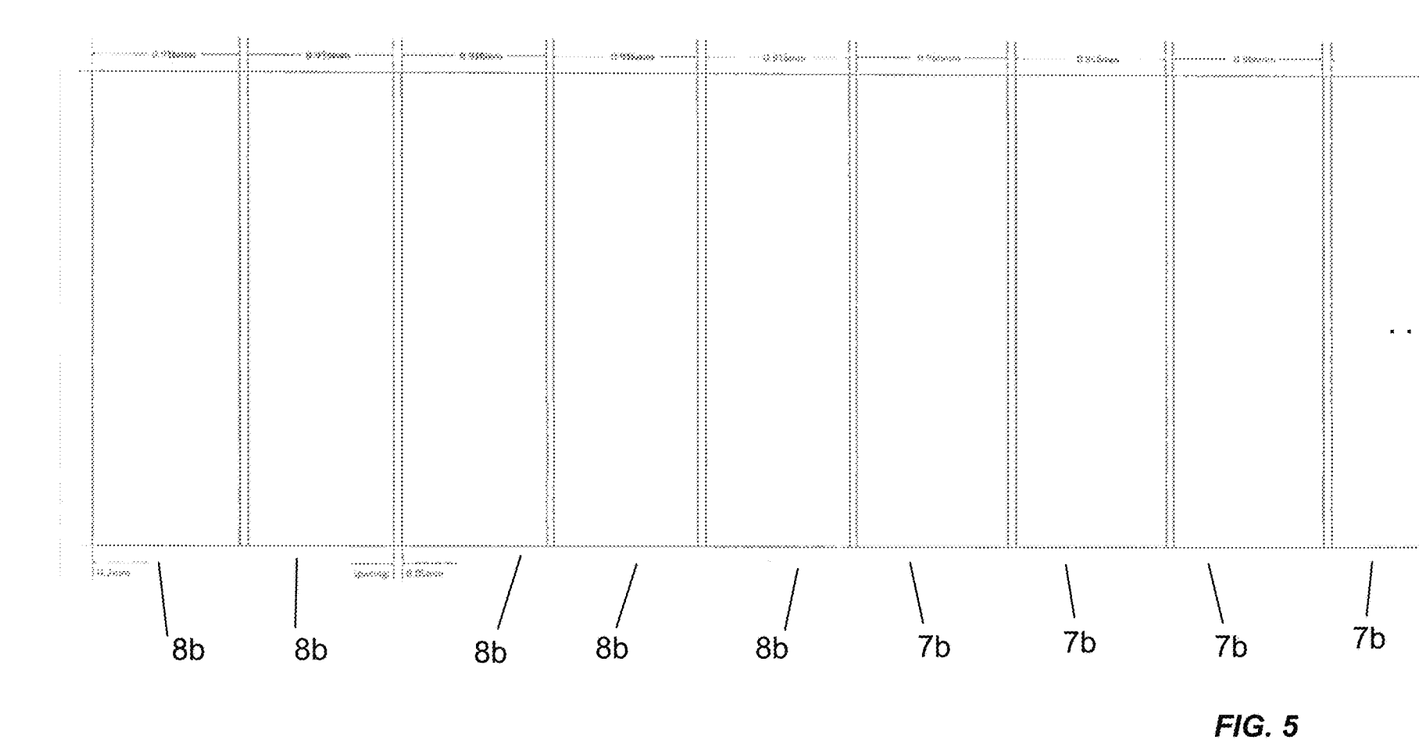
FIG. 5 the right-hand one of the sensor elements represented in FIG. 4.

In FIG. 5 only the right-hand one of the sensor elements represented in FIG. 4 is represented. It is furthermore recognizable herein that the spacing between two adjacent edge pixels is 0.05 mm. Further advantageous values are the following: 0.03 mm, 0.04 mm, 0.06 mm, 0.07 mm. Each of the aforementioned values per se can form upper or lower limits of preferred ranges.

In the present case, the spacings between adjacent central pixel elements within a sensor element, between adjacent edge pixel elements within a sensor element, and the spacing between an edge pixel element and an adjacent central pixel element within a sensor element are the same. Each of these spacings per se can also vary.

Figure 6:
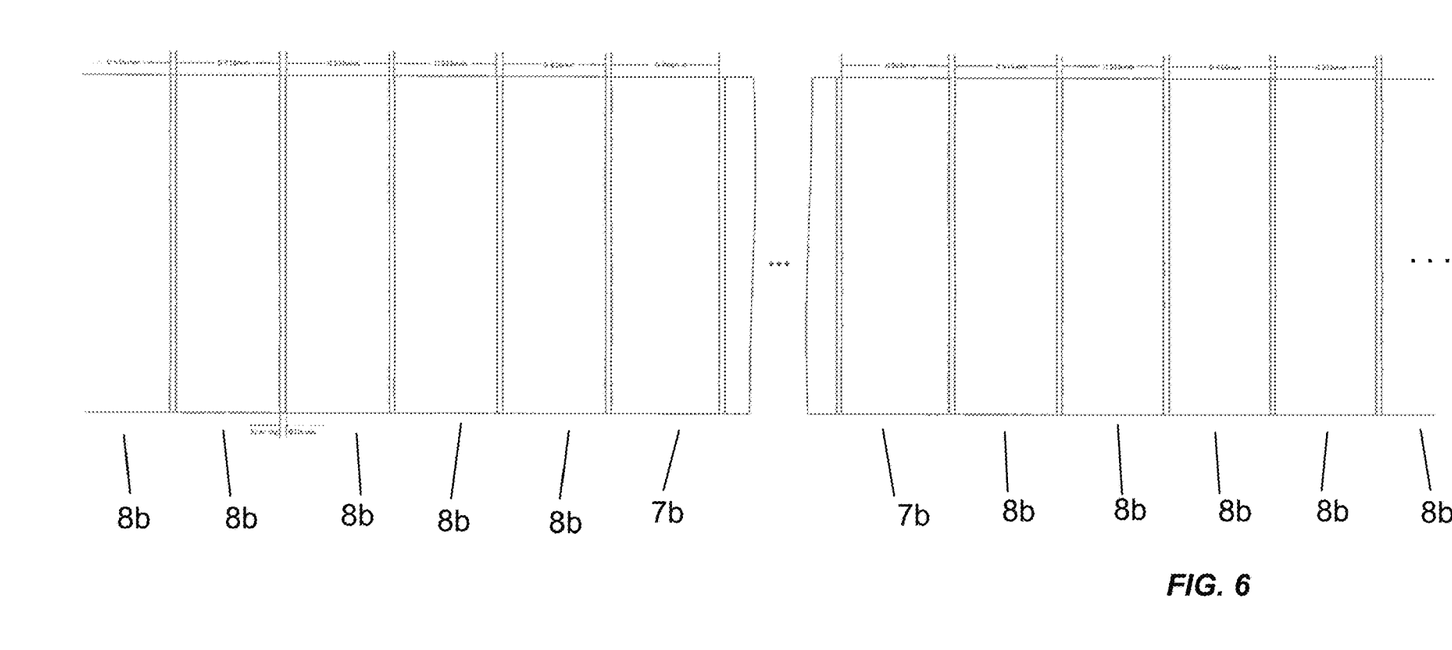
FIG. 6 the complete pixel arrangement of the right-hand sensor element from FIG. 4 in the longitudinal direction.

In FIG. 6, by way of example, the complete pixel arrangement of the right-hand sensor element from FIG. 4 in the longitudinal direction is represented.

The border represented on the left-hand side in FIG. 6 therefore corresponds to the left-hand border of the right-hand sensor element in FIG. 4. On the right-hand side in FIG. 6, the correspondingly opposite end border of the sensor element is represented. As is to be seen here, the corresponding narrower edge pixels are provided in both edge regions. As described above, this is not necessarily the case, and the narrower edge pixel elements can also be provided only on a single edge border.

The present invention has been described for pixel elements of photodiodes. However, the design can also be applied to any other known pixel elements. A pixel is, e.g., any active surface which can detect a signal to be detected.

FIG. 7 shows, by way of example, the calculation of the most favorable width of the edge pixels for ten edge pixels between two central pixels. Here, in addition to FIGS. 1 and 2, the spacing z between two adjacent sensor elements is divided into the spacing x between the last edge pixel and the end of the sensor element, or between the edge of the next sensor element and the first edge pixel of the next sensor element, and the spacing y between two sensor elements.

If, as shown in FIG. 7, the width c of the edge pixel elements of the sensor elements is identical, the width c of the edge pixels is calculated according to Formula 2:

$$c = \frac{\#R*(b+a) + a - (\#R-2)*d - 2e - 2x - y}{\#R} \quad \text{(Formula 2)}$$

wherein #R is the number of edge pixel elements in the gap between the closest-together first and second central pixel elements of the sensor elements arranged next to one another, a is the first predetermined, substantially equidistant spacing, b is the respective width of the central pixel elements, d is the second predetermined, substantially equidistant spacing between two adjacent edge pixel elements within the respective sensor element, e is a spacing between an edge pixel element and an adjacent central pixel element within the respective sensor element, x is a spacing between an edge of the sensor element and the edge pixel element, adjacent to the edge, of the respective sensor element, and y is the spacing between two adjacent sensor elements.

If the adjacent sensor elements are arranged on two different printed circuit boards, the variable y in Formula 2 above results from the sum of the spacing between two adjacent printed circuit boards and twice the spacing between the sensor element and the printed circuit board edge.

Figure 8:
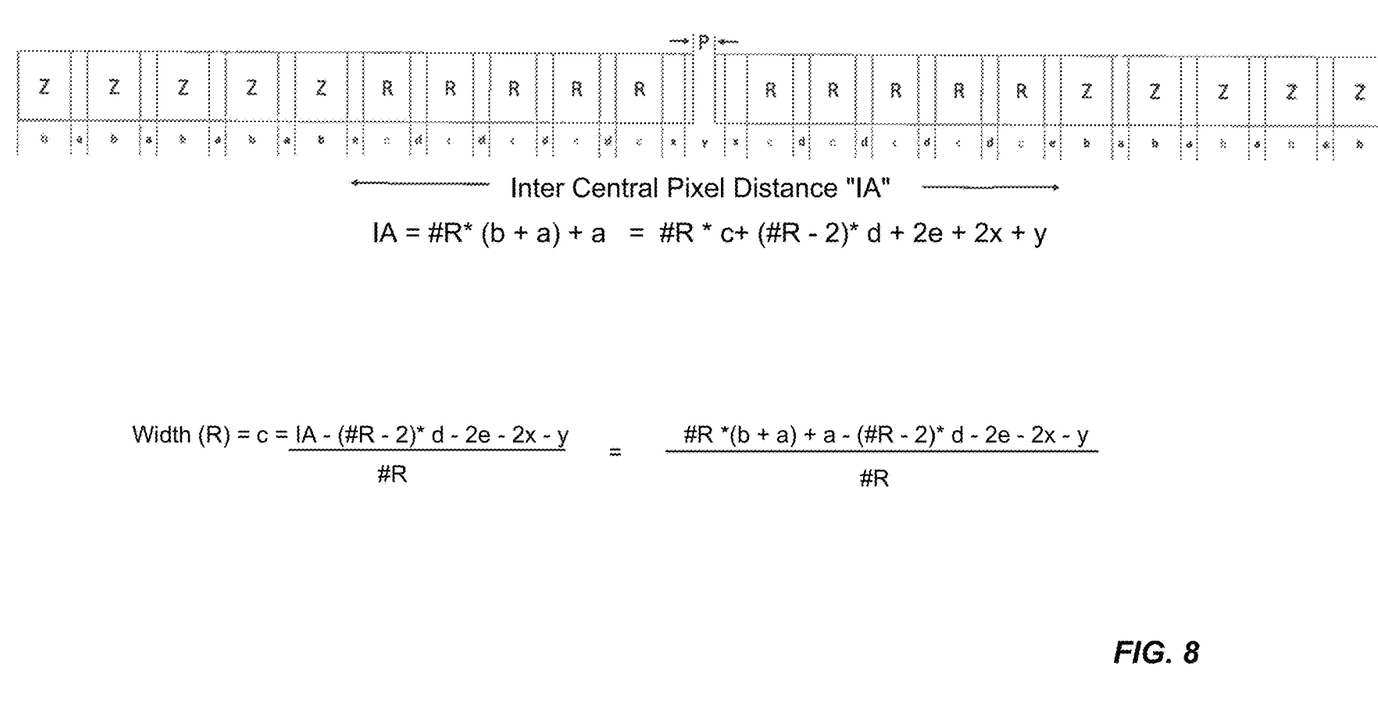
FIG. 8 a further example calculation for the width of the edge pixels for edge pixels of identical widths, wherein the sensor elements are distributed over two different printed circuit boards.

This situation is to be seen in FIG. 8. There, x denotes the spacing between the respective edge pixel and the end of the sensor element closest thereto, and P denotes the spacing between two printed circuit boards, i.e. the spacing between a first border of the first printed circuit board and a second border of the second printed circuit board.

Namely, in FIG. 8 a situation is represented in which two adjacent sensor elements are arranged on two different printed circuit boards; within the range of the variables y in Formula 2 above, the spacing between the printed circuit boards is then marked with "P".

In addition to the detector itself, the invention also specifies a method for displaying detection signals. This method is applied, e.g., with the detector according to the invention. For this purpose, the sensor signals from the edge pixel elements are processed in such a way that, in a visual display, the respective pixels displayed which correspond to the edge pixel elements are adapted to the dimension of the pixels displayed which correspond to the central pixel elements.

LIST OF REFERENCE SIGNS 1a first detector module
1b second detector module
2a, 2a', 2a'', 2a''' first sensor element
2b, 2b', 2b'' second sensor element
3a, 3b printed circuit board
4a, 4b signal processing functionality
5 pixel elements
6a, 6b border
Z, 7a, b central pixel elements
R, 8a, b edge pixel elements
9a, b visualized pixels resulting from the central pixels
10a, 1b visualized pixels resulting from the edge pixels
11 plug elements
14a, 14a', 15a, 15a' photocells or photodiodes element or sensor element
b central-pixel width
c edge-pixel width
k border spacing
d spacing between two adjacent edge pixel elements
z intra-edge-pixel spacing
i intra-central-pixel spacing
z3, z2 inter-pixel spacing between edge pixel elements of adjacent sensor elements within a detector module
z1 inter-pixel spacing between edge pixel elements of adjacent sensor elements of two adjacent detector modules
P spacing between two printed circuit boards
x spacing between the edge pixel and the end of the sensor element closest thereto
y spacing between two sensor elements
P spacing between two printed circuit boards

The invention claimed is:
1. A detector comprising:
a first sensor element (2a, 2a', 2a", 20a'"), which has a plurality of first pixel elements (7a, 8a) arranged linearly one behind another, and a second sensor element (2b, 2b', 2b", 2b'"), which has a plurality of second pixel elements (7b, 8b) arranged linearly one behind another,
wherein the first and second sensor elements (2a, 2a', 2a", 2a'", 2b, 2b', 2b", 2b'") are fitted next to one another, with the result that the second pixel elements (7b, 8b) are arranged in a line as an extension of the first pixel elements (7a, 8a),
the first pixel elements (7a, 8a) have first central pixel elements (7a) with a first width (b) which are arranged linearly one behind another at a first predetermined, substantially equidistant spacing (a) from one another, and the second pixel elements (7b, 8b) have second central pixel elements (7b) with a second width, which corresponds to the first width (b), wherein the second central pixel elements (7b) are arranged linearly one behind another at the first predetermined, substantially equidistant spacing (a) from one another, at which the first central pixel elements (7a) are arranged from one another, wherein a width of a pixel element corresponds to the dimension in the direction of the line defined by the pixel elements (7a, 8a, 7b, 8b) arranged one behind another,
wherein an inter-central-pixel spacing (i) between closest-together first and second central pixel elements (Z, 7a, 8a) of the sensor elements (2a, 2a', 2a", 2a'", 2b, 2b', 2b", 2b'") arranged next to one another corresponds to the following Formula 1:

$$i = n*(a+b)+a, \text{ wherein}$$

i is the inter-central-pixel spacing, n is a natural number, a is the first predetermined, substantially equidistant spacing, and b is the respective width of the central pixel elements (7a), and
wherein in a gap between the closest-together first and second central pixel elements (Z, 7a, 7b) of the sensor elements (2a, 2a', 2a", 2a'", 2b, 2b', 2b", 2b'") arranged next to one another edge pixel elements (R, 8a, 8b) are provided, which are arranged linearly one behind another and in line with the first and second central pixel elements (Z, 7a, 7b), wherein the edge pixel elements (R, 8a, 8b) have a third width, which is smaller than the first and second widths of the first and second central pixel elements (Z, 7a, 7b).

2. The detector according to claim 1, wherein in the gap between the closest-together first and second central pixel elements (Z, 7a, 7b) of the sensor elements (2a, 2a', 2a", 2a'", 2b, 2b', 2b", 2b'") arranged next to one another, such a number of edge pixel elements (R, 8a, 8b) is provided which corresponds to the natural number n from Formula 1.

3. The detector according to claim 1, wherein the edge pixel elements (R, 8a, 8b) are formed by first and second edge pixels, wherein the first edge pixel elements (8a) are arranged as an extension of the first central pixel elements (7a) in the first sensor element (2a, 2a', 2a", 2a'"), and the second edge pixel elements (8b) are arranged as an extension of the second central pixel elements (7b) in the second sensor element (2b, 2b', 2b", 2b'").

4. The detector according to claim 3, wherein the first edge pixel elements (8a) are arranged linearly one behind another at a second predetermined, substantially equidistant spacing (d) from one another, and the second edge pixel elements (8b) are arranged linearly one behind another at the second predetermined, substantially equidistant spacing (d) from one another, at which the first edge pixel elements (8a) are arranged from one another, wherein an inter-edge-pixel spacing (z) between closest-together first and second edge pixel elements of the sensor elements (2a, 2a', 2a", 2a'", 2b, 2b', 2b", 2b'") arranged next to one another is greater than the spacing between two adjacent first and second edge pixel elements (8a, 8b).

5. The detector according to claim 4, wherein the inter-edge-pixel spacing (z) is between 0.40 mm and 0.70 mm, in particular is 0.55 mm.

6. The detector according to claim 3, wherein the width (c) of the edge pixels is produced in accordance with Formula 2:

$$c = \frac{\#R(b+a) + a - (\#R-2)*d - 2e - 2x - y}{\#R}$$

wherein #R is the number of edge pixel elements (R, 8a, 8b) in the gap between the closest-together first and second central pixel elements (Z, 7a, 7b) of the sensor elements (2a, 2a', 2a", 2a'", 2b, 2b', 2b", 2b'") arranged next to one another,
a is the first predetermined, substantially equidistant spacing,
b is the respective width of the central pixel elements (Z, 7a, 7b),
d is the second predetermined, substantially equidistant spacing between two adjacent edge pixel elements (R, 8a, 8b) within the respective sensor element (2a, 2a', 2a", 2a'", 2b, 2b', 2b", 2b'"),
e is a spacing between an edge pixel element (R, 8a, 8b) and an adjacent central pixel element (7a) within the respective sensor element (2a, 2a', 2a", 2a'", 2b, 2b', 2b", 2b'"),
x is a spacing between an edge of the sensor element and the edge pixel element (R, 8a, 8b), adjacent to the edge, of the respective sensor element, and
y is the spacing between two adjacent sensor elements.

7. The detector according to claim 6, wherein the first sensor element (2a, 2a', 2a", 2a'") is arranged on a first printed circuit board (3a) and the second sensor element (2b, 2b', 2b", 2b'") is arranged on a second printed circuit board (3b), wherein the first and second printed circuit boards (3a, 3b) are arranged next to one another substantially abutting, with the result that a first border (6a) of the first printed circuit board (3a) is opposite a second border (6b) of the second printed circuit board (3b) in such a way that the borders (6a, 6b) run perpendicularly to the line defined by the pixel elements (7a, 8a, 7b, 8b) arranged one behind another; and
the spacing between the first border (6a) of the first printed circuit board (3a) and the second border (6b) of the second printed circuit board (3b) corresponds to a value P, and P is less than or equal to the value y in Formula 2.

8. The detector according to one of claim 3, wherein the number of first edge pixel elements (8a) corresponds to the number of second edge pixel elements (8b).

9. The detector according to claim 3, wherein the first and second sensor elements (2a, 2a', 2a", 2a'", 2b, 2b', 2b", 2b'") are arranged on a common printed circuit board (3a, 3b).

10. The detector r according to claim 9, wherein the spacing between the first edge pixel element (8a) closest to the first border (6a) and the first border (6a) is larger than the spacing between adjacent first edge pixel elements (8a) and/or is larger than the spacing between adjacent first central pixel elements (7a), and/or in that the spacing between the second edge pixel element (8b) closest to the second border (6b) and the second border (6b) is larger than the spacing between adjacent second edge pixel elements (8b) and/or is larger than the spacing between adjacent second central pixel elements (7b).

11. The detector according to claim 3, wherein the first sensor element (2a, 2a', 2a", 2a''') is arranged on a first printed circuit board (3a) and the second sensor element (2b, 2b', 2b", 2b''') is arranged on a second printed circuit board (3b), wherein the first and second printed circuit boards (3a, 3b) are arranged next to one another substantially abutting, with the result that a first border (6a) of the first printed circuit board (3a) is opposite a second border (6b) of the second printed circuit board (3b) in such a way that the borders (6a, 6b) run perpendicularly to the line defined by the pixel elements (7a, 8a, 7b, 8b) arranged one behind another.

12. The detector according to claim 11, wherein the sum of the spacing between the first and second borders (6a, 6b), the spacing between the first edge pixel element (8a) closest to the first border (6a) and the first border (6a), and the spacing between the second edge pixel element (8b) closest to the second border (6b) and the second border (6b) corresponds to the inter-edge-pixel spacing (i).

13. The detector according to claim 12, wherein the inter-central-pixel spacing (i) is between 8.178 mm and 12.242 mm, in particular is 10.21 mm.

14. The detector according to claim 9, wherein the first and/or second printed circuit board (3a, 3b) has signal processing components, with the result that a first or second sensor module is formed.

15. The detector according to claim 1, wherein ten or more edge pixels (8a, 8b) are provided.

16. The detector according to claim 1, wherein the natural number n from Formula 1 is ten or more.

17. The detector according to claim 1, wherein the edge pixel elements (8a, 8b) have a width of between 0.910 mm and 0.920 mm, in particular 0.916 mm, and/or the central pixel elements (7a, 7b) have a width of between 0.950 mm and 0.970 mm, in particular 0.966 mm.

18. A method for displaying detection signals from a detector according to claim 1, with the step of processing the sensor signals from the edge pixel elements (8a, 8b) in such a way that, in a visual display, the dimension of the respective pixel displayed which corresponds to the edge pixel elements (8a, 8b) is matched to the dimension of the pixels displayed which correspond to the central pixel elements (7a, 7b).

* * * * *